United States Patent
Iwashita et al.

(10) Patent No.: US 10,668,918 B2
(45) Date of Patent: Jun. 2, 2020

(54) CONTROL DEVICE FOR VEHICLE

(71) Applicant: Honda Motor Co., Ltd., Tokyo (JP)

(72) Inventors: Hideaki Iwashita, Saitama (JP);
Naoyuki Mimatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 252 days.

(21) Appl. No.: 15/979,471

(22) Filed: May 15, 2018

(65) Prior Publication Data

US 2018/0354500 A1 Dec. 13, 2018

(30) Foreign Application Priority Data

Jun. 9, 2017 (JP) .................................. 2017-114681

(51) Int. Cl.
*B60W 20/50* (2016.01)
*B60K 6/48* (2007.10)
(Continued)

(52) U.S. Cl.
CPC ............... *B60W 20/50* (2013.01); *B60K 6/48* (2013.01); *B60W 10/02* (2013.01); *B60W 10/06* (2013.01);
(Continued)

(58) Field of Classification Search
CPC ...... B60W 20/40; B60W 20/50; B60W 10/08; B60W 10/02; B60W 10/113; B60W 10/06; B60W 50/14; B60K 6/365; B60K 6/48; B60K 6/547; B60K 6/36; F16H 3/006; F16H 61/12; F16H 2061/1204
See application file for complete search history.

(56) References Cited

U.S. PATENT DOCUMENTS 5,934,395 A * 8/1999 Koide ................... B60W 20/15
180/65.235
6,098,733 A * 8/2000 Ibaraki ................... B60K 6/543
180/65.28
(Continued)

FOREIGN PATENT DOCUMENTS

JP 2002051407 2/2002
JP 2005029162 2/2005
(Continued)

OTHER PUBLICATIONS

Office Action of Japan Counterpart Application, with English translation thereof, dated Mar. 5, 2019, pp. 1-9.
(Continued)

*Primary Examiner* — Mussa A Shaawat
(74) *Attorney, Agent, or Firm* — JCIPRNET (57) ABSTRACT

Provided is a control device for a vehicle. A control device for a vehicle includes a vehicle that includes an engine and a main motor, and a transmission equipped with first and second input shafts which are respectively connected to the engine via first and second clutches, an output shaft through which power is output to drive wheels, first and second transmission mechanisms which respectively includes a plurality of transmission gears selectively joined to the first and second input shaft respectively, and an ECU. When the main motor is driven and when the engine is stopped, the ECU determines that the vehicle travels using power of the engine using the transmission gears of one of transmission mechanisms in a case where defective engagement release occurs such that a transmission gear of the other transmission mechanism is not disengaged.

12 Claims, 7 Drawing Sheets

(51) Int. Cl.
  *B60W 10/02* (2006.01)
  *B60W 10/06* (2006.01)
  *B60W 10/08* (2006.01)
  *B60W 10/113* (2012.01)
  *B60W 20/40* (2016.01)
  *B60W 50/14* (2020.01)
  *B60K 6/547* (2007.10)
  *B60K 6/36* (2007.10)

(52) U.S. Cl.
  CPC .......... *B60W 10/08* (2013.01); *B60W 10/113* (2013.01); *B60W 20/40* (2013.01); *B60W 50/14* (2013.01); *B60K 6/36* (2013.01); *B60K 6/547* (2013.01); *B60K 2006/4825* (2013.01); *B60W 2510/1005* (2013.01); *B60W 2520/04* (2013.01); *B60W 2520/10* (2013.01); *B60W 2540/06* (2013.01); *B60W 2710/021* (2013.01); *B60W 2710/1005* (2013.01); *B60Y 2200/92* (2013.01); *Y10S 903/909* (2013.01); *Y10S 903/919* (2013.01); *Y10S 903/93* (2013.01); *Y10S 903/945* (2013.01); *Y10S 903/946* (2013.01)

(56) References Cited

U.S. PATENT DOCUMENTS

| | | | | |
|---|---|---|---|---|
| 6,540,035 | B2* | 4/2003 | Nagano | B60L 50/61 180/65.21 |
| 7,823,668 | B2* | 11/2010 | Ogata | B60K 6/48 180/65.265 |
| 8,160,781 | B2* | 4/2012 | Naono | G05B 13/024 307/10.1 |
| 8,234,026 | B2* | 7/2012 | Wyatt | B60L 3/00 701/22 |
| 8,770,328 | B2* | 7/2014 | Hilberer | B60T 8/17616 180/65.265 |
| 2002/0016660 | A1* | 2/2002 | Suzuki | B60K 6/48 701/62 |
| 2002/0117338 | A1* | 8/2002 | Itou | B60W 10/02 180/54.1 |
| 2007/0155583 | A1* | 7/2007 | Tabata | B60K 6/387 477/37 |
| 2018/0163859 | A1* | 6/2018 | Kobayashi | F16H 61/12 |

FOREIGN PATENT DOCUMENTS

| | | |
|---|---|---|
| JP | 2007237774 | 9/2007 |
| JP | 2011235706 | 11/2011 |
| JP | 2013180696 | 9/2013 |
| JP | 2013203098 | 10/2013 |
| JP | 2016-013732 | 1/2016 |

OTHER PUBLICATIONS

"Office Action of Japan Counterpart Application," dated Dec. 25, 2018, with English translation thereof, pp. 1-9.

* cited by examiner

CONTROL DEVICE FOR VEHICLE

CROSS-REFERENCE TO RELATED APPLICATION

This application claims the priority of Japan patent application serial no. 2017-114681, filed on Jun. 9, 2017. The entirety of the above-mentioned patent application is hereby incorporated by reference herein and made a part of this specification.

BACKGROUND

Technical Field

The disclosure relates to a control device for a vehicle including a transmission to which at least two transmission mechanisms are attached.

Description of Related Art

Hybrid vehicles including an electric motor (motor) in addition to an internal combustion engine (engine) as power sources are known. Examples of transmissions used for such hybrid vehicles include a twin-clutch transmission equipped with an odd-number gear stage clutch which can connect and disconnect a first input shaft of a first transmission mechanism constituted of shift stages of odd-number gear stages (for example, first, third, and fifth gear stages), and an even-number gear stage clutch which can connect and disconnect a second input shaft of a second transmission mechanism constituted of shift stages of even-number gear stages (for example, second, fourth, and sixth gear stages). In the twin-clutch transmission, gears are shifted by being alternately connected to the two connection/disconnection mechanisms. In addition, examples of such a twin-clutch transmission include a transmission having a configuration in which a rotary shaft of the electric motor is joined to the first input shaft of the first transmission mechanism (for example, refer to Patent Document 1).

Incidentally, in such hybrid vehicles, there may be cases of unexpected situations where off-gear cannot be performed in one transmission mechanism of the first transmission mechanism or the second transmission mechanism. In this case, even in a case where off-gear can be performed normally in the other transmission mechanism, if appropriate control for using the other transmission mechanism cannot be performed, a control device is obliged to determine that traveling cannot be performed. Therefore, in the related art, a vehicle could not travel in a case where off-gear cannot be performed in one transmission mechanism.

[Patent Document 1] Japanese Patent Application Laid-Open No. 2016-013732

SUMMARY

One of the embodiments of the disclosure provides a control device for a vehicle performing control such that a vehicle can travel even with only one transmission mechanism of two transmission mechanisms.

According to one of the embodiments of the disclosure, there is provided a control device (10) for a vehicle including a vehicle (1) that includes an internal combustion engine (engine 2) and an electric motor (main motor 3) serving as power sources, and a transmission (4) equipped with a first input shaft (IMS) which is connected to the electric motor (3) and is selectively connected to the internal combustion engine (2) via a first power transmission element (first clutch C1), a second input shaft (SS) which is selectively connected to the internal combustion engine (2) via a second power transmission element (second clutch C2), an output shaft (CS) through which power is output to drive wheels (WL and WR), a first transmission mechanism (G1) which includes a plurality of transmission gears (planetary gear mechanism 50, third drive gear 73, fifth drive gear 75, and seventh drive gear 77) selectively joined to the first input shaft (IMS), a second transmission mechanism (G2) which includes a plurality of other transmission gears (second drive gear 72, fourth drive gear 74, and sixth drive gear 76) selectively joined to the second input shaft (SS); and a control unit (ECU 11) that executes selection of the transmission gears (50, 72, 73, 74, 75, 76, and 77) of the first transmission mechanism (G1) and the second transmission mechanism (G2), an operation of the first power transmission element (C1) and the second power transmission element (C2), and driving control over the internal combustion engine (2) and the electric motor (3). When the electric motor (3) is driven and when the internal combustion engine (2) is stopped, the control unit (11) determines that the vehicle (1) travels using power of the internal combustion engine (2) using the transmission gears of the second transmission mechanism (G2) in a case where defective engagement release occurs such that a transmission gear of the first transmission mechanism (G1) is not disengaged, and the control unit (11) determines that the vehicle (1) travels using power of the internal combustion engine (2) using the transmission gears of the first transmission mechanism (G1) in a case where defective engagement release occurs such that a transmission gear of the second transmission mechanism (G2) is not disengaged.

In addition, in one of the embodiments of the disclosure, in the control device (10) for a vehicle, the control unit (11) may determine that the vehicle (1) travels by using a lowest transmission gear of the second transmission mechanism (G2) in a case where defective engagement release occurs in the transmission gears of the first transmission mechanism (G1), and the control unit (11) may determine that the vehicle (1) travels by using the lowest transmission gear of the first transmission mechanism (G1) in a case where defective engagement release occurs in the transmission gears of the second transmission mechanism (G2).

In addition, in one of the embodiments of the disclosure, in the control device (10) for a vehicle, the vehicle (1) may further include a vehicle speed detection unit (34) which detects a vehicle speed. The control unit (11) may cause the internal combustion engine (2) to start while the vehicle (1) travels, in a case where a value of the vehicle speed detection unit (34) is equal to or greater than a predetermined speed (VL) when defective engagement release occurs.

In addition, in one of the embodiments of the disclosure, in the control device (10) for a vehicle, the control unit (11) may cause the first power transmission element (C1) and the second power transmission element (C2) to be in a neutral state until the value of the vehicle speed detection unit (34) becomes smaller than a predetermined high-speed (VH) which is higher than the predetermined speed (VL), in a case where the value of the vehicle speed detection unit (34) is equal to or greater than the predetermined high-speed (VH) when defective engagement release occurs.

In addition, in one of the embodiments of the disclosure, in the control device (10) for a vehicle, the control unit (11) may cause the internal combustion engine (2) to start while the vehicle (1) travels in a case where the control unit (11)

determines that a shift stage to be used for starting the internal combustion engine (2) is a predetermined shift stage or higher when defective engagement release occurs.

In addition, in one of the embodiments of the disclosure, in the control device (10) for a vehicle, the control unit (11) may cause the internal combustion engine (2) to start by using rotary power of the output shaft (CS) in a case where the internal combustion engine (2) starts while the vehicle (1) travels.

In addition, in one of the embodiments of the disclosure, in the control device (10) for a vehicle, the vehicle (1) may further include a display unit (38) which displays a condition of the vehicle (1). The control unit (11) may cause the display unit (38) to display a malfunction in a case where the internal combustion engine (2) starts while the vehicle (1) travels when defective engagement release occurs.

In addition, in one of the embodiments of the disclosure, in the control device (10) for a vehicle, the vehicle (1) may further include a vehicle speed detection unit (34) which detects a vehicle speed. The control unit (11) may cause the internal combustion engine (2) to start after the vehicle (1) stops, in a case where a value of the vehicle speed detection unit (34) is smaller than the predetermined speed (VL) when defective engagement release occurs.

In addition, in one of the embodiments of the disclosure, in the control device (10) for a vehicle, the control unit (11) may cause the internal combustion engine (2) to start after the vehicle (1) stops, in a case where the control unit determines that a shift stage to be used for starting the internal combustion engine (2) is lower than the predetermined shift stage when defective engagement release occurs.

In addition, in one of the embodiments of the disclosure, in the control device (10) for a vehicle, the vehicle (1) may further include a starting motor (17) which starts the internal combustion engine (2). The control unit (11) may cause the internal combustion engine (2) to start using rotary power of the starting motor (17) in a case where the internal combustion engine (2) starts after the vehicle (1) stops.

In addition, in one of the embodiments of the disclosure, in the control device (10) for a vehicle, the vehicle (1) may further include a startup switch (ST) for starting up the vehicle (1). The control unit (11) may cause the internal combustion engine (2) to start in a case where a signal from the startup switch (ST) is input after the vehicle (1) stops.

In addition, in one of the embodiments of the disclosure, in the control device (10) for a vehicle, the vehicle (1) may further include a display unit (38) which displays a condition of the vehicle (1). The control unit (11) may cause the display unit (38) to display a stop instruction and to display an instruction to start the internal combustion engine (2) after the vehicle (1) stops in a case where the internal combustion engine (2) starts after the vehicle (1) stops when defective engagement release occurs.

Each of the reference signs in the parentheses above indicates the reference sign of the corresponding constituent element in the following embodiment, as an example of the disclosure.

DESCRIPTION OF THE EMBODIMENTS

According to one of the embodiments of the disclosure, even in the case where defective engagement release occurs in the transmission gears of one of the first transmission mechanism and the second transmission mechanism when the electric motor is driven and when the internal combustion engine is stopped, since the control unit determines that the vehicle travels by using the transmission gear of the other of the first transmission mechanism and the second transmission mechanism and using power of the internal combustion engine, it is possible to avoid a state where the vehicle is incapable of traveling. Accordingly, even in the case where defective engagement release occurs, the vehicle can travel.

According to one of the embodiments of the disclosure, since the lowest transmission gear is used when the vehicle travels by using the transmission gear of one transmission mechanism in which no defective engagement release occurs, the vehicle can reliably travel.

According to one of the embodiments of the disclosure, since the internal combustion engine starts while the vehicle travels in the case where the vehicle speed is equal to or higher than the predetermined speed, traveling can continue without stopping the vehicle even in the case where defective engagement release occurs.

According to one of the embodiments of the disclosure, since the power transmission elements are blocked to prevent power of the internal combustion engine from being transmitted, until the vehicle speed reaches a speed suitable for using the predetermined transmission gear in a case where the vehicle is traveling at a high speed, sudden deceleration is suppressed and smooth traveling can be performed.

According to one of the embodiments of the disclosure, since the internal combustion engine starts while the vehicle travels in the case where the shift stage to be used for starting the internal combustion engine is the predetermined shift stage or higher when defective engagement release occurs, traveling can continue even in the case where defective engagement release occurs.

According to one of the embodiments of the disclosure, since the internal combustion engine (2) starts while the vehicle (1) travels, traveling can continue without stopping the vehicle by effectively utilizing rotary power of the output shaft (CS) during traveling even in the case where defective engagement release occurs.

According to one of the embodiments of the disclosure, since the display unit displays a malfunction when defective engagement release occurs, a driver of the vehicle can be informed of a malfunction in the vehicle (1).

According to one of the embodiments of the disclosure, since the vehicle first stops in the case where the vehicle speed is lower than the predetermined speed, a driver does not feel sudden acceleration or deceleration caused while traveling continues with a low-speed transmission gear in the case of low-speed traveling. In addition, since the vehicle is in a condition of being capable of traveling by starting the internal combustion engine after the vehicle stops, the vehicle can travel.

According to one of the embodiments of the disclosure, since the vehicle first stops in the case where the shift stage to be used for starting the internal combustion engine (2) is lower than the predetermined shift stage when defective engagement release occurs, a driver does not feel sudden acceleration or deceleration caused while traveling continues with a low-speed transmission gear. In addition, since the vehicle is in a condition of being capable of traveling by starting the internal combustion engine after the vehicle stops, the vehicle can travel.

According to one of the embodiments of the disclosure, since the internal combustion engine reliably starts up by using rotary power of the starting motor, the vehicle can travel.

According to one of the embodiments of the disclosure, since a startup timing of the vehicle is determined based on an input signal from the startup switch, a driver can determine the startup timing of the vehicle.

According to one of the embodiments of the disclosure, since the display unit displays an instruction to stop the vehicle or an instruction to start the vehicle in a case where the internal combustion engine starts after the vehicle stops, a driver can ascertain a timing for stopping the vehicle or a timing for starting the vehicle.

According to one of the embodiments of the control device for a vehicle of the disclosure, it is possible to perform control such that a vehicle can travel even with only one transmission mechanism of two transmission mechanisms.

Figure 1:
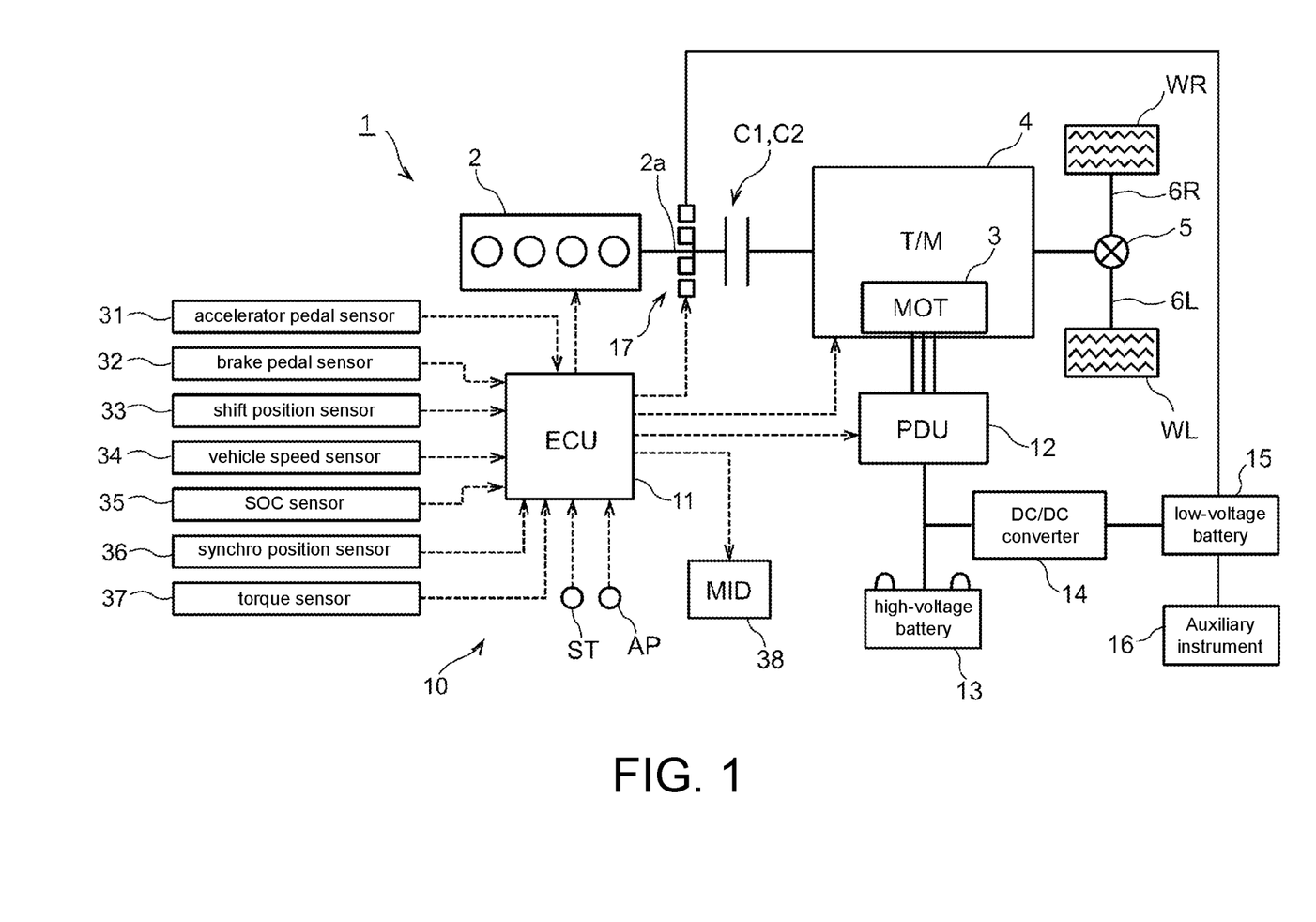
FIG. 1 is a schematic view illustrating an example of a configuration of a hybrid vehicle including a control device for a vehicle.

Hereinafter, an embodiment of the disclosure will be described in detail with reference to the accompanying drawings. FIG. 1 is a schematic view illustrating an example of a configuration of a hybrid vehicle including a control device 10 for a hybrid vehicle according to the present embodiment. As illustrated in FIG. 1, a vehicle 1 of the present embodiment is a vehicle (hybrid car) that includes an engine 2 and a main motor 3 serving as power sources.

The vehicle 1 further includes a power drive unit (PDU) 12 for controlling the main motor 3, a high-voltage battery 13, a transmission 4, a differential mechanism 5, right and left drive shafts 6R and 6L, and right and left drive wheels WR and WL. In addition, examples of the engine 2 include a diesel engine and a turbo engine. A rotary driving force of the engine 2 and the main motor 3 is transmitted to the right and left drive wheels WR and WL via the transmission 4, the differential mechanism 5, and the drive shafts 6R and 6L.

In the vehicle 1, a low-voltage battery 15 (12 V) is connected to the PDU 12 and the high-voltage battery 13 via a transformer 14 (DC/DC converter). The power of the low-voltage battery 15 is supplied to auxiliary instruments 16 (low-voltage systems) mounted in the vehicle, such as a car audio or light fixtures. In addition, the low-voltage battery 15 also supplies power to a starting motor 17 for starting the engine 2 at the time of an emergency.

The vehicle 1 has the control device 10 including an electronic control unit (ECU) 11. The ECU 11 controls the engine 2, the main motor 3, the starting motor 17, the transmission 4, the differential mechanism 5, the PDU 12, and the like.

For example, the ECU 11 may not only be constituted as one unit but may also be constituted of a plurality of ECUs including an engine ECU for controlling the engine 2, a motor generator ECU for controlling the main motor 3 and the PDU 12, a battery ECU for controlling the high-voltage battery 13, an AT-ECU for controlling the transmission 4, and the like. The ECU 11 of the present embodiment not only issues a command for supplying fuel to the engine 2 in response to an operation of an accelerator pedal AP but also issues a command for an output to the main motor 3, and the like. In addition, even in a case where the accelerator pedal AP is not in operation, the ECU 11 issues a command for starting the engine 2, as necessary. The details will be described below.

The engine 2 is an internal combustion engine to which a command for injecting fuel is issued in response to an operation of the accelerator pedal AP and which generates a driving force for causing the vehicle 1 to travel by combusting a fuel-air mixture. During cooperative traveling with the engine 2 and the main motor 3 or during single traveling with only the main motor 3, the main motor 3 generates a driving force for causing the vehicle 1 to travel by utilizing electrical energy of the high-voltage battery 13. In addition, the main motor 3 functions as a generator generating power through regeneration of the main motor 3, when the vehicle 1 decelerates. At the time of regeneration of the main motor 3, the high-voltage battery 13 is charged by using power (regenerative energy) generated by the main motor 3 and exchanges power between the high-voltage battery 13 and the main motor 3.

Various control signals of a plurality of control parameters are input to the ECU 11. Examples of the control signals include a start command signal output when a startup switch ST for starting up the vehicle 1 is pressed, an accelerator pedal opening degree from an accelerator pedal sensor 31 detecting the stepping quantity of the accelerator pedal AP, a brake pedal opening degree from a brake pedal sensor 32 detecting the stepping quantity of a brake pedal, a shift position from a shift position sensor 33 detecting a gear stage (shift stage), a vehicle speed from a vehicle speed sensor 34 detecting a vehicle speed, a state of charge (SOC) from an SOC sensor 35 sensing the SOC of the high-voltage battery 13, a position of each synchromesh mechanism from a synchro position sensor 36, and a measurement value of a torque sensor 37 being disposed in a rotary shaft and sensing power. The ECU 11 performs control based on information from the sensors.

The control device 10 has a display unit 38 (MID: multi-information display) which displays information obtained by the ECU 11. The display unit 38 visualizes and display information to be delivered to a driver. Accordingly, in a case of a situation to which a driver needs to be alerted, the driver is alerted by displaying, for example, malfunction information of the vehicle, warnings, and a command related to driving.

Figure 2:
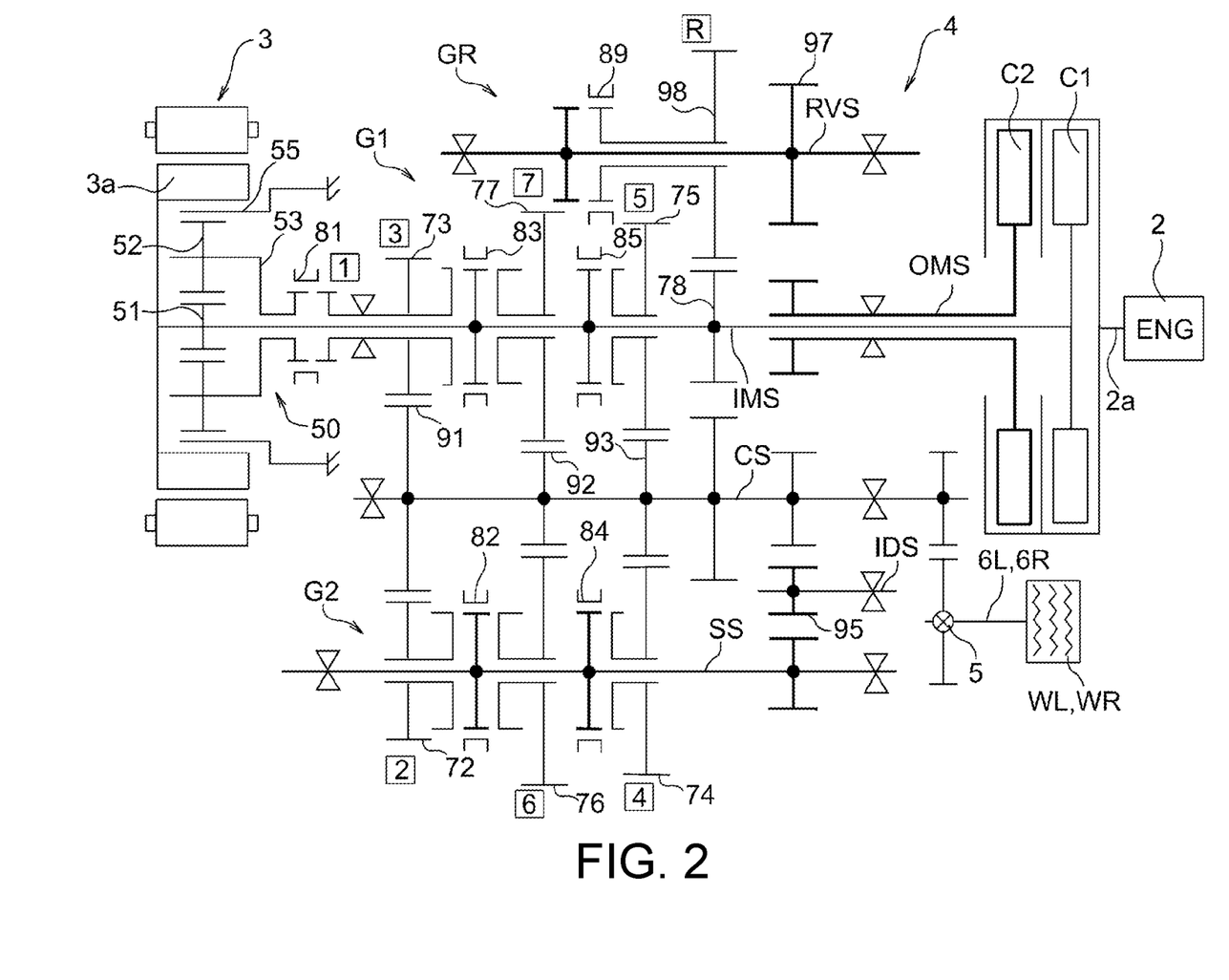
FIG. 2 a connection block diagram of a transmission illustrated in FIG. 1.

Next, a configuration of the transmission 4 included in the vehicle 1 of the present embodiment will be described. FIG. 2 is a connection block diagram of the transmission 4 illustrated in FIG. 1. The transmission 4 of the present embodiment is a parallel-axis transmission, that is, a dry-type dual clutch transmission (DCT) having seven forward gears and one reverse gear.

The transmission 4 has a first input shaft IMS which is selectively connected to an engine output shaft 2a of the engine 2 via a first clutch C1, a second input shaft SS which is selectively connected to the engine output shaft 2a of the engine 2 via a second clutch C2, and an output shaft CS which is connected to the first input shaft IMS and the second input shaft SS via a transmission gear mechanism.

Gears for odd-number gear stages (first, third, fifth, and seventh gears) are disposed in the first input shaft IMS, and gears for even-number gear stages (second, fourth, and sixth gears) are disposed in the second input shaft SS. The output shaft CS is connected to the differential mechanism 5 and generates a driving force (rotary output) corresponding to the selected shift stage with respect to the drive wheels WR and WL.

In addition, a planetary gear mechanism 50 is disposed on one end side of the first input shaft IMS. A rotor 3a of the main motor 3 is connected to the first input shaft IMS, and the rotor 3a of the main motor 3 is configured to rotate around the planetary gear mechanism 50. Due to such a configuration, the transmission 4 functions as a transmission of a hybrid vehicle while the engine 2 and the main motor 3 serve as the power sources of the vehicle 1.

An outer main shaft OMS is connected to the second clutch C2 on an output side, and the outer main shaft OMS is disposed concentrically with the first input shaft IMS and forms an outer tube of the first input shaft IMS. The outer main shaft OMS engages with a reverse shaft RVS and the second input shaft SS at all times via an idle shaft IDS, and a rotary output of the second clutch C2 is transmitted to the reverse shaft RVS and the second input shaft SS. The shafts are parallel to each other.

A first transmission mechanism G1 for realizing the shift stages of the odd-number gear stages will be described. A third drive gear 73, a seventh drive gear 77, and a fifth drive gear 75 are concentrically disposed on the first input shaft IMS in a relatively rotatable manner. A third/seventh gear synchromesh mechanism 83 is provided between the third drive gear 73 and the seventh drive gear 77 to be slidable in an axial direction, and a fifth gear synchromesh mechanism 85 corresponding to the fifth drive gear 75 is provided to be slidable in the axial direction.

Due to such a configuration, when any desired one of the gears for the odd-number shift stages (the planetary gear mechanism 50 serving as the first drive gear, the third drive gear 73, the fifth drive gear 75, and the seventh drive gear 77) is selected, one or a plurality of first synchronous engagement units (a first gear synchromesh mechanism 81, the third/seventh gear synchromesh mechanism 83, and the fifth gear synchromesh mechanism 85) disposed in the first input shaft IMS are moved. Accordingly, the selected desired shift stage is joined to the first input shaft IMS.

Each of the drive gears of the first transmission mechanism G1 meshes with a corresponding gear in output gears provided on the output shaft CS. Specifically, the third drive gear 73 meshes with a first output gear 91, the seventh drive gear 77 meshes with a second output gear 92, and the fifth drive gear 75 meshes with a third output gear 93. In this manner, the output shaft CS is rotatably driven through meshing.

A second transmission mechanism G2 for realizing the shift stages of the even-number gear stages will be described. A second drive gear 72, a sixth drive gear 76, and a fourth drive gear 74 are concentrically disposed on the second input shaft SS in a relatively rotatable manner. A second/sixth gear synchromesh mechanism 82 is provided between the second drive gear 72 and the sixth drive gear 76 to be slidable in the axial direction, and a fourth gear synchromesh mechanism 84 corresponding to the fourth drive gear 74 is provided to be slidable in the axial direction.

Due to such a configuration, when any desired one of the gears for the even-number shift stages (the second drive gear 72, the fourth drive gear 74, and the sixth drive gear 76) is selected, one or a plurality of second synchronous engagement units (the second/sixth gear synchromesh mechanism 82 and the fourth gear synchromesh mechanism 84) disposed in the second input shaft SS are moved. Accordingly, the selected shift stage is joined to the second input shaft SS.

Each of the drive gears of the second transmission mechanism G2 meshes with a corresponding gear in the output gears provided on the output shaft CS. Specifically, the second drive gear 72 meshes with the first output gear 91, the sixth drive gear 76 meshes with the second output gear 92, and the fourth drive gear 74 meshes with the third output gear 93. In this manner, the output shaft CS is rotatably driven through meshing.

The planetary gear mechanism 50 is disposed at one end of the first input shaft IMS on the main motor 3 side. The planetary gear mechanism 50 includes a sun gear 51, a pinion gear 52, and a ring gear 55. The sun gear 51 is fixed to the first input shaft IMS and rotates integrally with the first input shaft IMS and the main motor 3. The ring gear 55 is fixed to a case of the transmission 4 and is configured to generate a shifted output from a carrier 53 of the pinion gear 52.

The first gear synchromesh mechanism 81 is provided between the carrier 53 of the planetary gear mechanism 50 and the third drive gear 73 on the first input shaft IMS. When the first gear synchromesh mechanism 81 is ON in response to selection of the first gear stage, the carrier 53 and the third drive gear 73 on the first input shaft IMS are connected to each other. Consequently, due to a rotary driving force of the carrier 53, the output shaft CS is rotatably driven via the third drive gear 73 and the first output gear 91.

A reverse transmission mechanism GR for realizing a reverse gear stage will be described. A gear 97 engaging with an idle gear 95 of the idle shaft IDS is fixed to the reverse shaft RVS. Moreover, the reverse gear stage for causing the reverse shaft RVS to be selectively coupled to the first input shaft IMS is provided on the outer circumference of the reverse shaft RVS. The reverse gear stage is constituted of a reverse drive gear 98 which is provided concentrically with the reverse shaft RVS in a relatively rotatable manner, and a reverse synchromesh mechanism 89 for causing the reverse drive gear 98 to be selectively coupled to the reverse shaft RVS. The reverse drive gear 98 meshes with a gear 78 fixed to the first input shaft IMS.

The reverse synchromesh mechanism 89 is slidable in the axial direction of the reverse shaft RVS. At the time of forward traveling, the reverse synchromesh mechanism 89 does not allow engagement between the reverse shaft RVS and the reverse drive gear 98. On the other hand, at the time of reverse traveling, the reverse synchromesh mechanism 89 allows engagement between the reverse shaft RVS and the reverse drive gear 98.

Next, a method of starting the engine 2 included in the vehicle 1 of the present embodiment will be described. In the present embodiment, in addition to a normal starting mode in which power of the main motor 3 is transmitted to an engine output shaft 2a and the engine 2 is driven, the method of starting the engine 2 includes the following two starting modes. Specifically, the method includes a first starting mode in which power of the output shaft CS during traveling is transmitted to the engine output shaft 2a and the engine 2 is driven, and a second starting mode in which the engine 2 is driven by using power of the starting motor 17 and by pressing the startup switch ST when the vehicle 1 is stopped.

In the vehicle 1 having the configuration as described above, at the time of traveling with only the main motor 3 without using the engine 2 (EV traveling), there is concern that a malfunction may occur such that transmission gears of one of the first transmission mechanism G1 and the second transmission mechanism G2 are not disengaged (defective engagement release). In such a case where defective engagement release occurs, the ECU 11 of the present embodiment causes a transmission gear, in which defective engagement release has not occurred in the transmission gears of the other of the first transmission mechanism G1 and the second transmission mechanism G2, to engage so that the vehicle 1 is in a condition of being capable of traveling. In addition, the ECU 11 determines that the engine 2 starts by using the first starting mode or the second starting mode described above for causing the vehicle 1 to travel and the vehicle 1 travels using power of the engine 2. Next, the details will be described.

Figure 3:
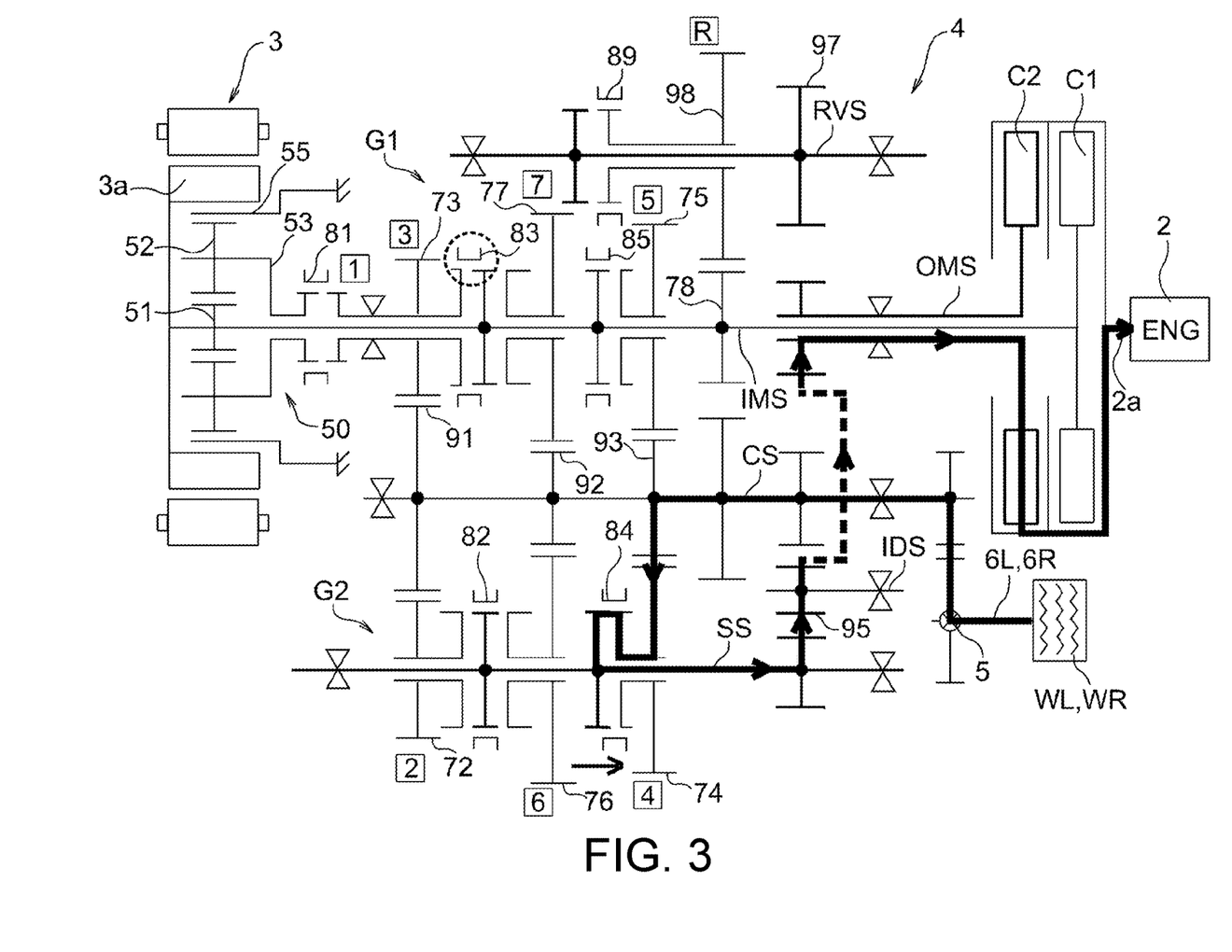
FIG. 3 is a connection block diagram illustrating a power transmission path at the time of starting an engine using a second transmission mechanism in a case where defective engagement release occurs in a first transmission mechanism.

Using FIGS. 3 and 4, a case where traveling continues by using the transmission gears of the second transmission mechanism G2 in a case where defective engagement release occurs in the first transmission mechanism G1 will be described. FIG. 3 is a connection block diagram illustrating a power transmission path at the tune of starting the engine 2 using the second transmission mechanism G2 in a case where defective engagement release occurs in the first transmission mechanism G1. In FIG. 3, a case where the engine 2 starts by using the fourth drive gear 74 in the second transmission mechanism G2 in a case where defective engagement release occurs in the third drive gear 73 in the first transmission mechanism G1 will be described as an example.

While the vehicle 1 is in EV traveling with the third drive gear 73, as illustrated in FIG. 3, in a case where defective engagement release occurs such that the third/seventh gear synchromesh mechanism 83 cannot move to be in the neutral state from the third drive gear 73 side, the ECU 11 detects defective engagement release (defective off-gear). Defective engagement release can be detected by obtaining information of the synchro position sensor 36. However, detection thereof is not limited thereto.

In a case where the ECU 11 determines that the engine 2 can start by transmitting power of the output shaft CS to the engine 2 via the fourth drive gear 74, for example, in a case where the fourth gear synchromesh mechanism 84 on the second transmission mechanism G2 side is pre-shifted to the fourth drive gear 74 side, the ECU 11 applies the first starting mode using the transmission gears of the second transmission mechanism G2. In a case of the present embodiment, the second clutch C2 is applied in a state where the fourth gear synchromesh mechanism 84 is moved to the fourth drive gear 74 side. Accordingly, power of the output shaft CS is transmitted to the engine 2, and the engine 2 starts.

In a case where defective engagement release occurs, the first clutch C1 is released. Therefore, power of the first input shaft IMS which is a drive shaft on the first transmission mechanism G1 side where defective engagement release occurs is not transmitted to the engine output shaft 2a. Therefore, power of the main motor 3 attached to the first input shaft IMS is not transmitted to the engine output shaft 2a.

Next, a state where the vehicle 1 travels using power of the engine 2 in a case of defective engagement release of the first transmission mechanism G1 will be described. FIG. 4 is a connection block diagram illustrating a power transmission path in a case where the vehicle travels using power of the engine 2 using the transmission gears of the second transmission mechanism G2 at the time of defective engagement release of the first transmission mechanism G1. In a case where defective engagement release occurs in the transmission gears of the first transmission mechanism G1, the ECU 11 causes the vehicle 1 to travel by using the lowest transmission gear of the second transmission mechanism G2. In the present embodiment, the vehicle 1 travels by using the second drive gear 72 which is the lowest gear stage of the second transmission mechanism G2.

After the engine 2 starts, the second clutch C2 is released first, the second/sixth gear synchromesh mechanism 82 is moved to the second drive gear 72 side, and the fourth gear synchromesh mechanism 84 is moved from the fourth drive gear 74 side to be in the neutral state. Consequently, the second drive gear 72 is in an in-gear state, and the fourth drive gear 74 is in an off-gear state.

Figure 4:
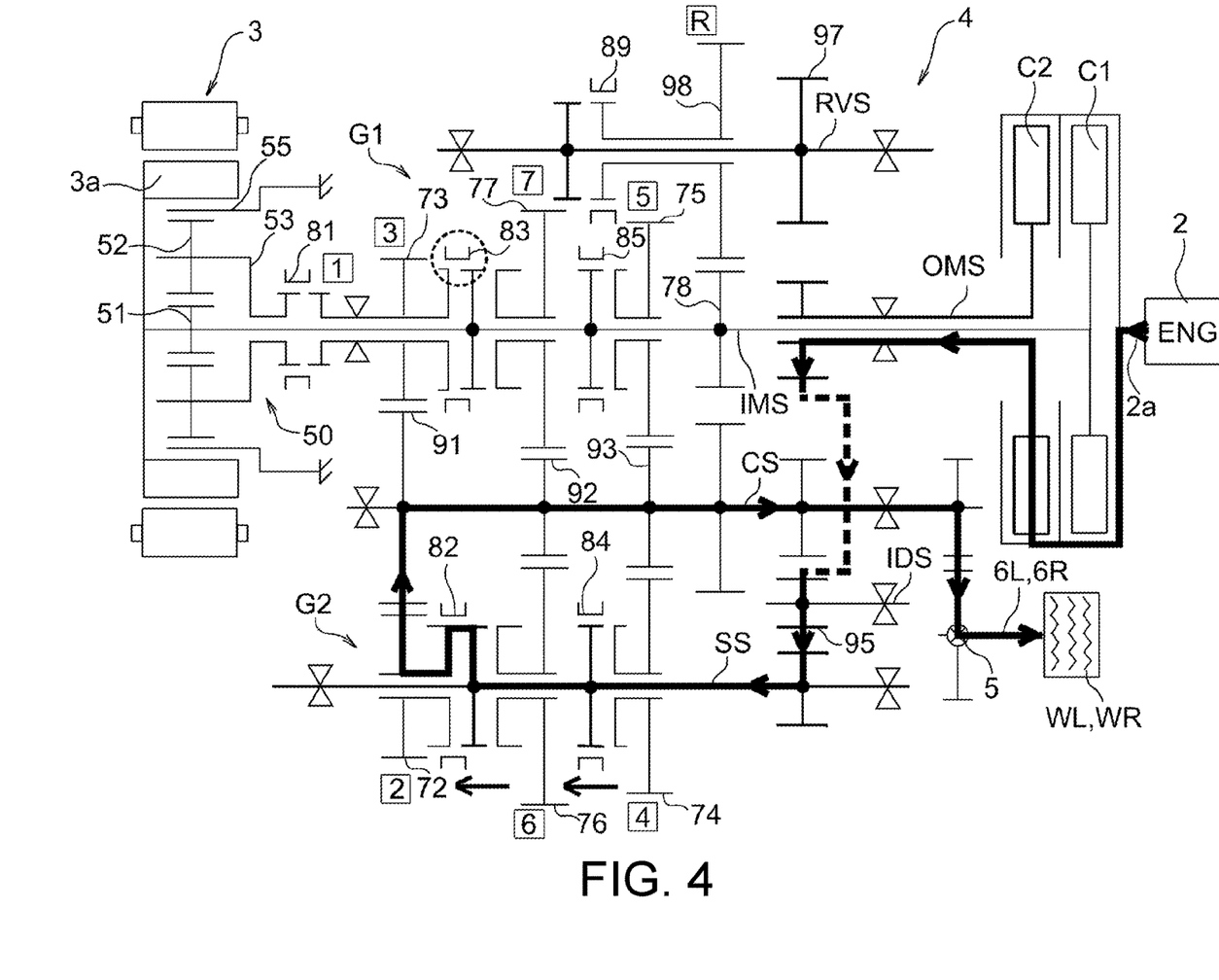
FIG. 4 is a connection block diagram illustrating a power transmission path in a case where the vehicle travels using power of the engine using the transmission gears of the second transmission mechanism at the time of defective engagement release of the first transmission mechanism.

When the second clutch C2 is applied, as illustrated in FIG. 4, power of the engine 2 is transmitted from the outer main shaft OMS to the second input shaft SS through the idle shaft IDS. Next, power is transmitted to the second drive gear 72 via the second/sixth gear synchromesh mechanism 82 and is further transmitted to the first output gear 91 meshing with the second drive gear 72, thereby being transmitted to the output shaft CS. Power transmitted to the output shaft CS is transmitted to the drive wheels WR and WL via the differential mechanism 5, and the vehicle 1 travels. When the second clutch C2 is applied, in order to avoid sudden acceleration or deceleration, it is preferable in one of the embodiments that the second clutch C2 be gently applied.

Figure 5:
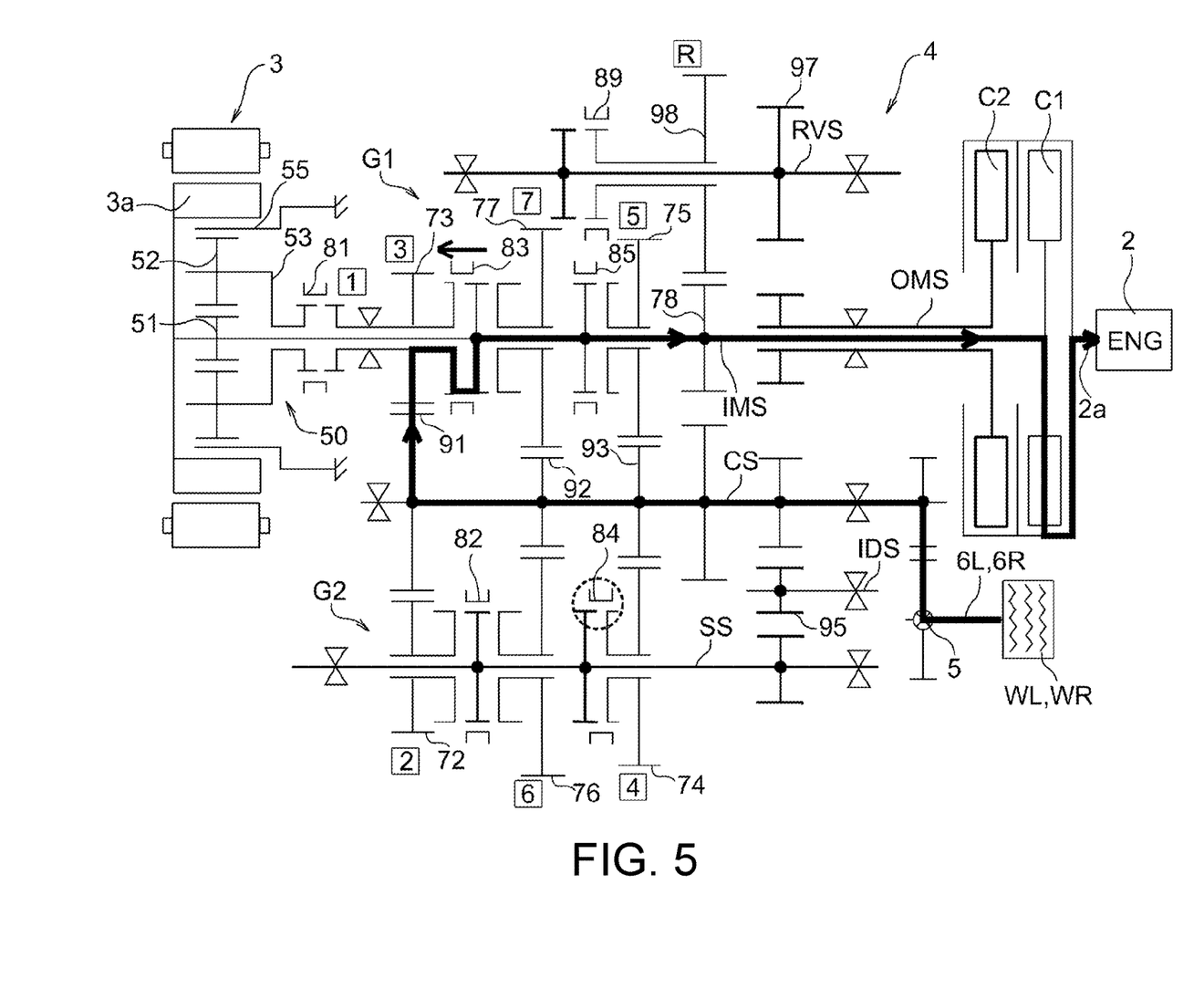
FIG. 5 is a connection block diagram illustrating a power transmission path at the time of starting the engine using the first transmission mechanism in a case where defective engagement release occurs in the second transmission mechanism.

Using FIGS. 5 and 6, a case where traveling continues by using the transmission gears of the first transmission mechanism G1 in a case where defective engagement release occurs in the second transmission mechanism G2 will be described. FIG. 5 is a connection block diagram illustrating a power transmission path at the time of starting the engine 2 using the first transmission mechanism G1 in a case where defective engagement release occurs in the second transmission mechanism G2. In FIG. 5, a case where the engine 2 starts by using the third drive gear 73 in the first transmission mechanism G1 in a case where defective engagement release occurs in the fourth drive gear 74 in the second transmission mechanism G2 will be described as an example.

While the vehicle 1 is in EV traveling with the fourth drive gear 74, as illustrated in FIG. 5, in a case where defective engagement release occurs such that the fourth gear synchromesh mechanism 84 cannot move to be in the neutral state from the fourth drive gear 74 side, the ECU 11 detects defective engagement release.

In a case where the ECU 11 determines that the engine 2 can start by transmitting power of the output shaft CS to the engine 2 via the third drive gear 73 on the first transmission mechanism G1 side, the ECU 11 applies the first starting mode using the transmission gears of the first transmission mechanism G1. In a case of the present embodiment, the first clutch C1 is applied in a state where the third/seventh gear synchromesh mechanism 83 is moved to the third drive gear 73 side. Accordingly, power of the output shaft CS is transmitted to the engine 2, and the engine 2 starts.

In a case where defective engagement release occurs, the second clutch C2 is released. Therefore, power of the outer main shaft OMS which is a drive shaft on the second transmission mechanism G2 side where defective engagement release occurs is not transmitted to the engine output shaft 2a. Meanwhile, power of the main motor 3 attached to the first input shaft IMS as the first clutch C1 is applied can be transmitted to the engine output shaft 2a. Therefore, in starting of the engine 2, not only power of the output shaft CS but also power of the main motor 3 can be applied.

Next, a state where the vehicle 1 travels using power of the engine 2 in a case of defective engagement release of the second transmission mechanism G2 will be described. FIG. 6 is a connection block diagram illustrating a power transmission path in a case where the vehicle travels using power of the engine 2 using the transmission gears of the first transmission mechanism G1 at the time of defective engagement release of the second transmission mechanism G2. In a case where defective engagement release occurs in the transmission gears of the second transmission mechanism G2, the ECU 11 causes the vehicle 1 to travel by using the lowest transmission gear of the first transmission mechanism G1. In the present embodiment, the vehicle 1 travels by using the third drive gear 73 which is the lowest gear stage of the first transmission mechanism G1.

After the engine 2 starts, the first clutch C1 is released first, the first gear synchromesh mechanism 81 is moved to the planetary gear mechanism 50 side, and the third/seventh gear synchromesh mechanism 83 is moved from the third drive gear 73 side to be in the neutral state. Consequently, the planetary gear mechanism 50 is in an in-gear state, and the third drive gear 73 is in an off-gear state.

Figure 6:
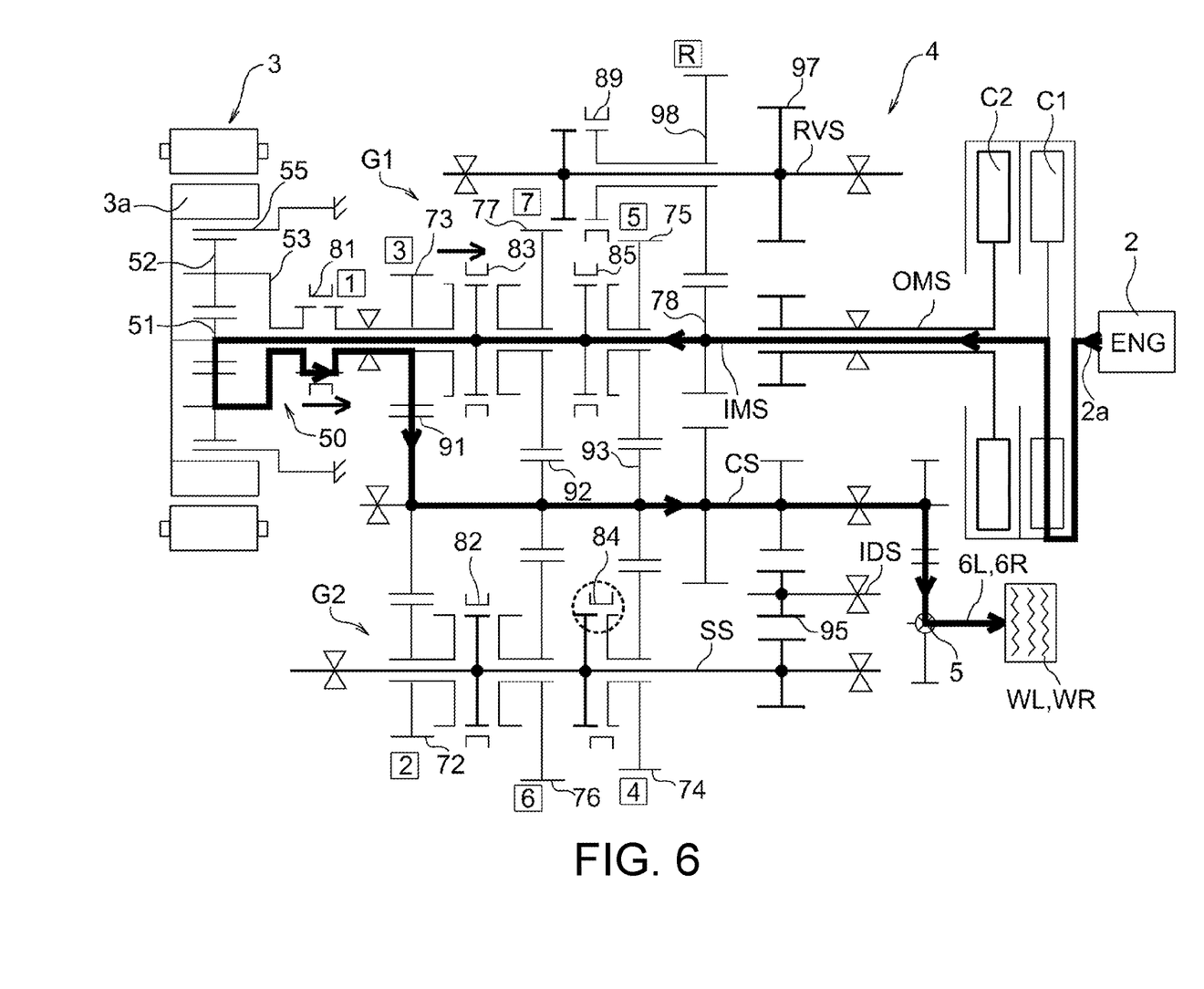
FIG. 6 is a connection block diagram illustrating a power transmission path in a case where the vehicle travels using power of the engine using the transmission gears of the first transmission mechanism at the time of defective engagement release of the second transmission mechanism.

When the first clutch C1 is applied, as illustrated in FIG. 6, power of the engine 2 is transmitted from the first input shaft IMS to the planetary gear mechanism 50. Furthermore, the power is transmitted to the first output gear 91 via the first gear synchromesh mechanism 81, thereby being transmitted to the output shaft CS. Power transmitted to the output shaft CS is transmitted to the drive wheels WR and WL via the differential mechanism 5, and the vehicle 1 travels. When the first clutch C1 is applied, in order to avoid sudden acceleration or deceleration, it is preferable in one of the embodiments that the first clutch C1 be gently applied.

Figure 7:
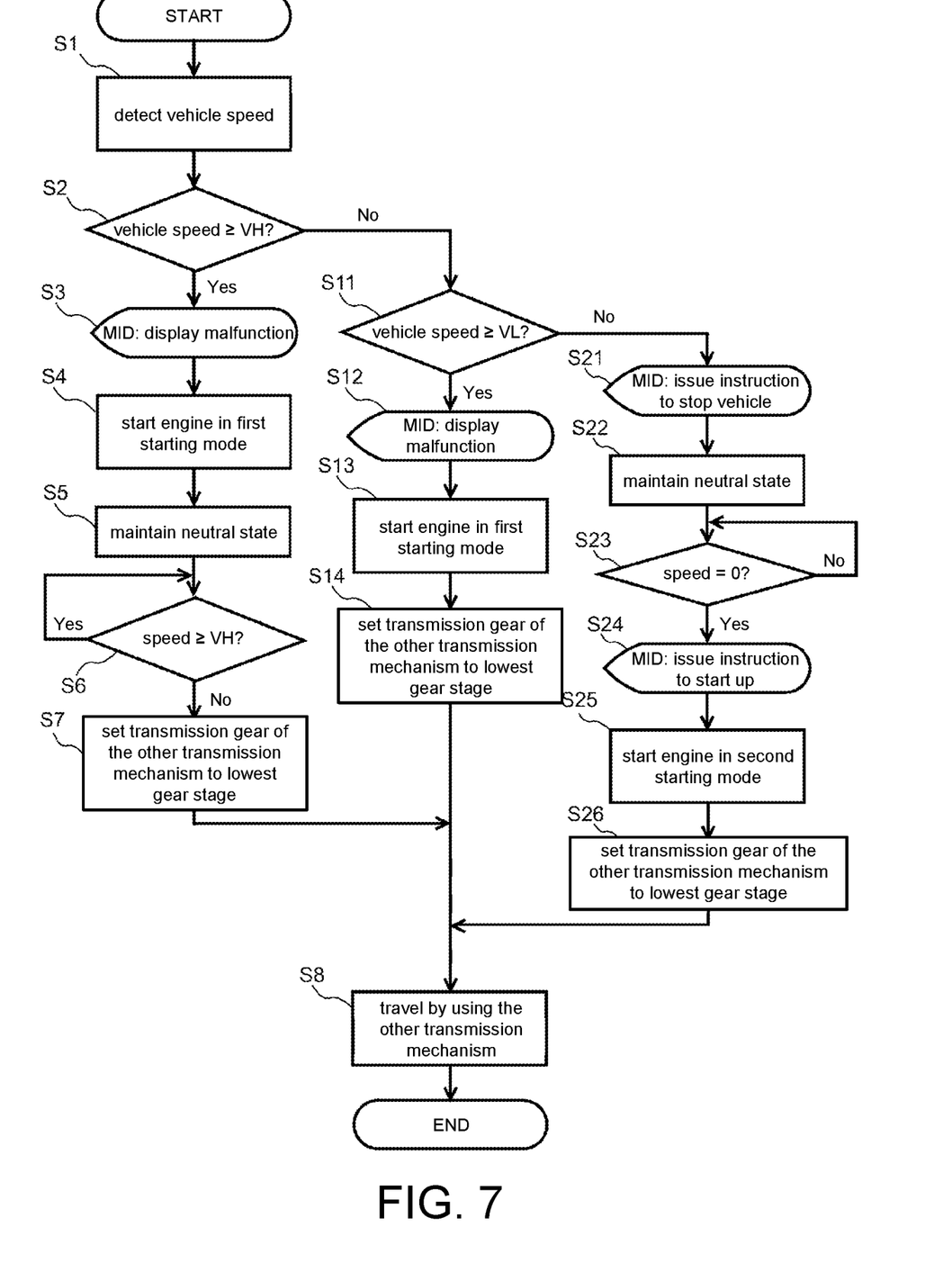
FIG. 7 is a flowchart illustrating differences in control timing corresponding to a vehicle speed.

As described above, in a case where defective engagement release occurs in one transmission mechanism, the ECU 11 causes the vehicle 1 to travel with a lowest transmission gear of the other transmission mechanism. In this case, in order to appropriately perform the control, the ECU 11 makes the timing of performing the control described above different depending on the vehicle speed of the vehicle 1. Next, the details will be described. FIG. 7 is a flowchart illustrating differences in control timing corresponding to a vehicle speed.

In the present embodiment, a threshold value for determining whether or not the engine 2 starts while the vehicle 1 continues traveling when defective engagement release occurs is referred to as a predetermined speed VL. In addition, a threshold value for determining whether or not the engine 2 starts immediately when defective engagement release occurs is referred to as a predetermined high-speed VH. The predetermined high-speed VH is a speed higher than the predetermined speed VL.

During EV traveling, in a case where defective engagement release occurs in one transmission mechanism of the first transmission mechanism G1 and the second transmission mechanism G2, as illustrated in FIG. 7, first, the ECU 11 checks the value of the vehicle speed sensor 34 (Step S1).

First, a case where the vehicle speed is equal to or higher than the predetermined high-speed VH when defective engagement release occurs will be described. In a case where the value of the vehicle speed sensor 34 is equal to or greater than the predetermined high-speed VH (Step S2), the ECU 11 causes the display unit 38 to display that a malfunction has occurred (Step S3). Accordingly, a driver can be informed of a malfunction such as defective engagement release which has occurred in the vehicle.

The ECU 11 causes the engine 2 to start in the first starting mode in which the engine 2 starts using power of the output shaft CS while traveling continues (Step S4). Here, in a case where the vehicle speed is equal to or higher than the predetermined high-speed VH, if the vehicle travels immediately in the lowest gear stage of the other transmission mechanism in which defective engagement release has not occurred, a disadvantage such as sudden deceleration occurs. Therefore, the ECU 11 causes the first clutch C1 and the second clutch C2 to be in the neutral state (not applied) until the value of the vehicle speed sensor 34 becomes smaller than the predetermined high-speed VH (Step S5). In a case where the value of the vehicle speed sensor 34 becomes smaller than the predetermined high-speed VH (Step S6), the transmission gear of the other transmission mechanism is set to the lowest gear stage (Step S7).

Thereafter, power of the engine 2 is transmitted to the transmission gear of the other transmission mechanism by applying the clutch. Accordingly, the vehicle 1 travels (Step S8). At this time, it is preferable in one of the embodiments that the clutch be gently applied.

Next, a case where the vehicle speed is lower than the predetermined high-speed VH and is equal to or higher than the predetermined speed VL when defective engagement release occurs will be described. In a case where the value of the vehicle speed sensor 34 is smaller than the predetermined high-speed VH and is equal to or greater than the predetermined speed VL (Step S11), the ECU 11 causes the display unit 38 to display that a malfunction has occurred (Step S12). Accordingly, a driver can be informed of a malfunction such as defective engagement release which has occurred in the vehicle.

The ECU 11 causes the engine 2 to start in the first starting mode in which the engine 2 starts using power of the output shaft CS while traveling continues (Step S13), and the transmission gear of the other transmission mechanism is set to the lowest gear stage (Step S14). Thereafter, the vehicle 1 travels using the transmission gear of the other transmission mechanism (Step S8).

Lastly, a case where the vehicle speed is lower than the predetermined speed VL when defective engagement release occurs will be described. If the engine 2 starts in the first starting mode while traveling continues in a case where the value of the vehicle speed sensor 34 is smaller than the predetermined speed VL, there is concern that the reduction ratio may increase and traveling may become unstable. Therefore, in this case, the ECU 11 causes the display unit 38 to display an instruction to stop the vehicle 1 while indicating that traveling cannot continue (Step S21). The display unit 38 displays a message, for example, "Traveling cannot continue. Please stop the vehicle at a safe place". Accordingly, a driver can be informed that the vehicle 1 needs to stop for a moment. As an instruction displayed by the display unit 38, not only an instruction to stop but also an instruction that the engine 2 needs to start after the stop may be simultaneously displayed.

At this time, the ECU 11 prompts a driver to decelerate the vehicle 1 by causing the first clutch C1 and the second clutch C2 to be in the neutral state (not applied) (Step S22), or the like. In a case where the vehicle 1 stops (Step S23), the ECU 11 causes the display unit 38 to display an instruction to prompt a driver to press the startup switch ST, for example, "Please press the switch while stepping on the brake" (Step S24). In a case where the vehicle 1 stops, if the ECU 11 performs control over applying a parking brake as necessary, the vehicle 1 can stop reliably and safely, which is preferable.

If a driver presses the startup switch ST in accordance with an instruction from the ECU 11, the ECU 11 causes the engine 2 to start in the second starting mode in which the engine 2 starts using power of the starting motor 17 (Step S25). Thereafter, the ECU 11 sets the transmission gear of the other transmission mechanism to the lowest gear stage (Step S26), and causes the vehicle 1 to travel using the transmission gear of the other transmission mechanism (Step S8).

In the present embodiment, when defective engagement release occurs, it is determined whether or not the engine 2 starts while the vehicle 1 continues traveling and having the vehicle speed (predetermined speed VL) as the threshold value. However, the embodiment is not limited thereto. For example, as a modification example of the present embodiment, the engine 2 may start while the vehicle 1 travels in a case where it is determined that the shift stage of the transmission gear for starting the engine 2 is a predetermined shift stage or higher when defective engagement release occurs. The engine 2 may start after the vehicle 1 stops in a case where it is determined that the shift stage of the transmission gear is lower than the predetermined shift stage.

Specifically, the ECU 11 may issue an instruction to stop the vehicle 1 through the display unit 38 in a case where the predetermined shift stage is set to the second gear stage, defective engagement release occurs in the second transmission mechanism G2 at the time of low-speed EV traveling, and the synchro position sensor 36 on the first transmission mechanism G1 side to be used for starting the engine 2 detects the first gear stage. In this case, in a case where defective engagement release occurs in the second transmission mechanism G2 and the synchro position sensor 36 on the first transmission mechanism G1 side to be used for starting the engine 2 detects the third gear stage at the time of EV traveling, the ECU 11 causes the display unit 38 to display a malfunction, and the engine 2 starts in the first starting mode using the third drive gear 73 while the vehicle 1 continues traveling.

As described above, in the present embodiment, even in the case where defective engagement release occurs in the transmission gears of one of the first transmission mechanism G1 and the second transmission mechanism G2 when the main motor 3 is driven and when the engine 2 is stopped, since the ECU 11 determines that the vehicle 1 travels by using the transmission gear of the other of the first transmission mechanism G1 and the second transmission mechanism G2 and using power of the engine 2, it is possible to avoid a state where the vehicle 1 is incapable of traveling. Accordingly, the vehicle 1 can travel even in the case where defective engagement release occurs.

In addition, in the present embodiment, the ECU 11 determines that the vehicle 1 travels by using the second gear stage which is the lowest gear stage of the second transmission mechanism G2 in a case where defective engagement release occurs in the transmission gears of the first transmission mechanism G1, and the ECU 11 determines that the vehicle 1 travels by using the first gear stage which is the lowest gear stage of the first transmission mechanism G1 in a case where defective engagement release occurs in the transmission gears of the second transmission mechanism G2. In this manner, since the lowest transmission gear is used when the vehicle travels by using the transmission gear of one transmission mechanism in which no defective engagement release occurs, the vehicle can reliably travel.

In addition, in the present embodiment, the engine 2 starts while the vehicle 1 travels in a case where the vehicle speed is equal to or higher than the predetermined speed VL. Accordingly, in a case where the vehicle speed is equal to or higher than the predetermined speed VL, the vehicle 1 can continue traveling without stopping the vehicle 1 even in the case where defective engagement release occurs.

In addition, in the present embodiment, the first clutch C1 and the second clutch C2 are in the neutral state until the value of the vehicle speed sensor 34 becomes smaller than the predetermined high-speed VH in a case where the vehicle speed is equal to or higher than the predetermined high-speed VH. In this manner, since the clutches are blocked to prevent power of the engine 2 from being transmitted, until the vehicle speed reaches a speed suitable for using the predetermined transmission gear in a case where the vehicle 1 is traveling at a high speed, sudden deceleration is suppressed and smooth traveling can be performed.

In addition, in the modification example of the present embodiment, the engine 2 starts while the vehicle 1 travels in a case where the shift stage to be used for starting the engine 2 is the predetermined shift stage (for example, the second gear stage) or higher when defective engagement release occurs. In this manner, the engine 2 may start during traveling while having the predetermined transmission gear as the threshold value. Accordingly, traveling can continue even in the case where defective engagement release occurs.

In addition, in the present embodiment, the engine 2 starts by using rotary power of the output shaft CS in a case where the engine 2 starts while the vehicle 1 travels. In this manner, traveling can continue without stopping the vehicle 1 by effectively utilizing rotary power of the output shaft CS during traveling even in the case where defective engagement release occurs.

In addition, in the present embodiment, the ECU 11 causes the display unit 38 to display a malfunction when defective engagement release occurs. Accordingly, a driver of the vehicle 1 can be informed of a malfunction in the vehicle 1.

In addition, in the present embodiment, the vehicle 1 first stops in the case where the vehicle speed is lower than the predetermined speed VL. Accordingly, a driver does not feel sudden acceleration or deceleration caused while traveling continues with a low-speed transmission gear in the case of low-speed traveling. In addition, since the vehicle 1 is in a condition of being capable of traveling by starting the engine 2 after the vehicle 1 stops, the vehicle 1 can travel.

In addition, in the present embodiment, the engine 2 starts by using rotary power of the starting motor 17 in a case where the engine 2 starts after the vehicle 1 stops. Accordingly, since the engine 2 reliably starts up by using rotary power of the starting motor 17, the vehicle 1 can travel.

In addition, in the present embodiment, the ECU 11 causes the engine 2 to start in a case where a signal from the startup switch ST is input after the vehicle 1 stops. Accordingly, a driver can determine the startup timing of the vehicle 1.

In addition, in the present embodiment, the ECU 11 causes the display unit 38 to display a stop instruction and to display an instruction to start the engine 2 after the vehicle 1 stops in a case where the engine 2 starts after the vehicle 1 stops when defective engagement release occurs. In this manner, since the display unit 38 displays an instruction to stop the vehicle 1 or an instruction to start the vehicle 1 in a case where the engine 2 starts after the vehicle 1 stops, a driver can ascertain a timing for stopping the vehicle or a timing for starting the vehicle.

In addition, in the present embodiment, in a case where the value of the vehicle speed sensor 34 is equal to or greater than the predetermined speed VL when defective engagement release occurs, if the ECU 11 causes the engine 2 to start by using rotary power of the output shaft CS while the vehicle 1 travels, traveling can continue even in the case where defective engagement release occurs. Meanwhile, in a case where the vehicle speed is lower than the predetermined speed VL, if the engine 2 starts by using rotary power of an electric motor such as the main motor 3 after the vehicle 1 stops, a driver does not feel sudden acceleration or deceleration caused while traveling continues with a lowest transmission gear in the case of low-speed traveling. In addition, since the vehicle 1 is in a condition of being capable of traveling by starting the engine 2 after the vehicle 1 stops, the vehicle 1 can travel.

In addition, in the present embodiment, the ECU 11 causes the first clutch C1 and the second clutch C2 to be in the neutral state until the vehicle speed becomes lower than the predetermined high-speed VH in a case where the value of the vehicle speed sensor 34 is equal to or greater than the predetermined high-speed VH when defective engagement release occurs. In this manner, since the clutches are blocked to prevent power of the engine 2 from being transmitted, until the vehicle speed reaches a speed suitable for using the lowest transmission gear in a case where the vehicle 1 is traveling at a high speed, smooth traveling can be performed.

In addition, in the present embodiment, the ECU 11 may cause the engine 2 to start while the vehicle 1 travels in a case where the ECU 11 determines that the shift stage to be used for starting the engine 2 is the predetermined shift stage or higher when defective engagement release occurs. The ECU 11 may cause the engine 2 to start after the vehicle 1 stops in a case where the ECU 11 determines that the shift stage to be used for starting the engine 2 is lower than the predetermined shift stage when defective engagement release occurs.

In addition, in the present embodiment, the ECU 11 causes the display unit 38 to display a malfunction in a case where the engine 2 starts while the vehicle 1 travels when defective engagement release occurs. The ECU 11 causes the display unit 38 to display a stop instruction in a case where the engine 2 starts after the vehicle stops when defective engagement release occurs and to display an instruction to start the engine 2 after the vehicle stops. In this manner, since the display unit 38 displays a malfunction when defective engagement release occurs, a driver of the vehicle 1 can be instantly informed of a malfunction in the vehicle 1. In addition, since an instruction to stop the vehicle 1 is displayed in a case where the engine 2 starts after the vehicle 1 stops, a driver of the vehicle 1 can be instantly informed that the vehicle needs to stop.

Hereinabove, the embodiment of the disclosure has been described. However, the disclosure is not limited to the embodiment, and various changes can be made within the range of the technical scope disclosed in Claims, the specification, and the drawings.

What is claimed is:

1. A control device for a vehicle comprising:
   a vehicle that comprises
      an internal combustion engine and an electric motor serving as power sources, and
      a transmission equipped with
         a first input shaft which is connected to the electric motor and is selectively connected to the internal combustion engine via a first power transmission element,
         a second input shaft which is selectively connected to the internal combustion engine via a second power transmission element,
         an output shaft through which power is output to drive wheels,
         a first transmission mechanism which comprises a plurality of transmission gears selectively joined to the first input shaft, and
         a second transmission mechanism which comprises a plurality of other transmission gears selectively joined to the second input shaft; and
   a control unit that executes selection of the transmission gears of the first transmission mechanism and the second transmission mechanism, an operation of the first power transmission element and the second power transmission element, and driving control over the internal combustion engine and the electric motor,
   wherein when the electric motor is driven and when the internal combustion engine is at a stopped, the control unit determines that the vehicle travels using power of the internal combustion engine using the transmission gears of the second transmission mechanism in a case where defective engagement release occurs such that a transmission gear of the first transmission mechanism is not disengaged, and the control unit determines that the vehicle travels using power of the internal combustion engine using the transmission gears of the first transmission mechanism in a case where defective engagement release occurs such that a transmission gear of the second transmission mechanism is not disengaged.

2. The control device for a vehicle according to claim 1, wherein the control unit determines that the vehicle travels by using a lowest transmission gear of the second transmission mechanism in a case where defective engagement release occurs in the transmission gears of the first transmission mechanism, and the control unit determines that the vehicle travels by using the lowest transmission gear of the first transmission mechanism in a case where defective engagement release occurs in the transmission gear of the second transmission mechanism.

3. The control device for a vehicle according to claim 1, wherein the vehicle further comprises a vehicle speed detection unit which detects a vehicle speed, and
   wherein the control unit causes the internal combustion engine to start while the vehicle travels, in a case where a value of the vehicle speed detection unit is equal to or greater than a predetermined speed when the defective engagement release occurs.

4. The control device for a vehicle according to claim 3, wherein the control unit causes the first power transmission element and the second power transmission element to be in a neutral state until the value of the vehicle speed detection unit becomes smaller than a predetermined high-speed which is higher than the predetermined speed, in a case where the value of the vehicle speed detection unit is equal to or greater than the predetermined high-speed when the defective engagement release occurs.

5. The control device for a vehicle according to claim 1, wherein the control unit causes the internal combustion engine to start while the vehicle travels, in a case where the control unit determines that a shift stage to be used for starting the internal combustion engine is a predetermined shift stage or higher when the defective engagement release occurs.

6. The control device for a vehicle according to claim 3, wherein the control unit causes the internal combustion engine to start by using rotary power of the output shaft in a case where the internal combustion engine starts while the vehicle travels.

7. The control device for a vehicle according to claim 3, wherein the vehicle further comprises a display unit which displays a condition of the vehicle, and
wherein the control unit causes the display unit to display a malfunction in a case where the internal combustion engine starts while the vehicle travels when the defective engagement release occurs.

8. The control device for a vehicle according to claim 1, wherein the vehicle further comprises a vehicle speed detection unit which detects a vehicle speed, and
wherein the control unit causes the internal combustion engine to start after the vehicle stops, in a case where a value of the vehicle speed detection unit is smaller than a predetermined speed when the defective engagement release occurs.

9. The control device for a vehicle according to claim 1, wherein the control unit causes the internal combustion engine to start after the vehicle stops, in a case where the control unit determines that a shift stage to be used for starting the internal combustion engine is lower than a predetermined shift stage when the defective engagement release occurs.

10. The control device for a vehicle according to claim 8, wherein the vehicle further comprises a starting motor which starts the internal combustion engine, and
wherein the control unit causes the internal combustion engine to start by using rotary power of the starting motor in a case where the internal combustion engine starts after the vehicle stops.

11. The control device for a vehicle according to claim 8, wherein the vehicle further comprises a startup switch for starting up the vehicle, and
wherein the control unit causes the internal combustion engine to start in a case where a signal from the startup switch is input after the vehicle stops.

12. The control device for a vehicle according to claim 8, wherein the vehicle further comprises a display unit which displays a condition of the vehicle, and
wherein the control unit causes the display unit to display a stop instruction and to display an instruction to start the internal combustion engine after the vehicle stops in a case where the internal combustion engine starts after the vehicle stops when the defective engagement release occurs.

* * * * *